(12) United States Patent
Tsengas

(10) Patent No.: US 10,863,719 B1
(45) Date of Patent: Dec. 15, 2020

(54) INTERACTIVE PET TOY

(71) Applicant: OurPet's Company, Fairport Harbor, OH (US)

(72) Inventor: Steven Tsengas, Fairport Harbor, OH (US)

(73) Assignee: COSMIC PET LLC, Wichita, KS (US)

( * ) Notice: Subject to any disclaimer, the term of this patent is extended or adjusted under 35 U.S.C. 154(b) by 446 days.

(21) Appl. No.: 14/939,768

(22) Filed: Nov. 12, 2015

Related U.S. Application Data

(60) Provisional application No. 62/081,040, filed on Nov. 18, 2014.

(51) Int. Cl.
*A01K 15/02* (2006.01)

(52) U.S. Cl.
CPC .................. *A01K 15/025* (2013.01)

(58) Field of Classification Search
USPC ............... 119/707, 702, 706, 708; D30/160; 472/51, 54; 446/227, 308, 310, 311
See application file for complete search history.

(56) References Cited

U.S. PATENT DOCUMENTS

| | | | | |
|---|---|---|---|---|
| 5,634,435 A | * | 6/1997 | Udelle | A01K 15/025 119/706 |
| 5,875,736 A | * | 3/1999 | Udelle | A01K 15/025 119/706 |
| 6,591,785 B1 | * | 7/2003 | Boshears | A01K 15/024 119/706 |
| 7,823,541 B2 | * | 11/2010 | Comerford | A01K 15/025 119/707 |
| 8,109,239 B1 | * | 2/2012 | Smestad | A01K 15/025 119/702 |
| D724,795 S | * | 3/2015 | Cook | D30/160 |
| D787,757 S | * | 5/2017 | Comerford | D30/160 |
| 2002/0174839 A1 | * | 11/2002 | Horvath | A01K 15/025 119/707 |
| 2014/0216358 A1 | * | 8/2014 | Hansen | A01K 15/025 119/707 |
| 2015/0201584 A1 | * | 7/2015 | Crane | A01K 15/025 119/707 |
| 2015/0359194 A1 | * | 12/2015 | Coopman | A01K 15/025 119/706 |

FOREIGN PATENT DOCUMENTS

| | | | | |
|---|---|---|---|---|
| CN | 201234507 Y | * | 5/2009 | ............ A01K 15/02 |
| CN | 203762035 U | * | 8/2014 | ............ A01K 15/02 |
| WO | WO 2008/029495 | * | 3/2008 | ........... A01K 15/025 |

* cited by examiner

*Primary Examiner* — Andrea M Valenti
(74) *Attorney, Agent, or Firm* — Gugliotta & Gugliotta LPA

(57) ABSTRACT

A toy is provided that simulates hide-and-seek or peekaboo action moving randomly in and out in a non-sequential pattern about the housing, thereby catching the pet's attention and stimulating the animal's instinctive curiosity. An outer housing forms a travel guide defining a travel path of a generally concave polygon pattern. A motorized mechanism contained within the housing urges an elongated, flexible target about the travel guide so that the target can pass by egress openings located at the vertices in a bidirectional, random fashion.

3 Claims, 25 Drawing Sheets

INTERACTIVE PET TOY

RELATED APPLICATIONS

The present application claims benefit of U.S. Provisional Patent 62/081,040, filed on Nov. 18, 2015, and incorporated by reference as if fully rewritten herein.

BACKGROUND OF THE INVENTION

1. Field of the Invention

The present invention relates generally to animal amusement devices and, more particularly, to a novel interactive toy for pets.

2. Description of the Related Art

Many devices for promoting play and interaction with a pet are in existence today. Such toys, to be effective, must stimulate some instinctive behavior in the animal in order to garner, and retain, the animal's interest in the interaction. These toys can entertain a cat, dog or other pet; however, if the reaction of the toy becomes predictable the pet's attention tends to wain.

Once type of toy that stimulates the hunting nature of felines is a hide-and-seek, peekaboo type of toys that provide a moving target that alternately appears and disappears. Such devices will capitalize on a cat's, particularly domestic cat's, innate interest in hit-and-run and ambush-type games where the hunter is rewarded for his patience. Such games are attractive to both young and old pets in that they somewhat downplay the need for continuous strenuous physical activity on the part of the pet, which may result in lessened interest.

A search of the prior art did not disclose any patents that read directly on the claims of the instant invention; however, the following references were considered related.

U.S. Pat. No. 6,591,785 to Boshears teaches a cat's toy having a cheese housing with at least one port through its sidewall. A toy mouse is supported on a linkage within the housing. The linkage reciprocates a portion of the mouse through the port so that the "mice" emerge from and return into the "cheese". Sensors detect cat's motion proximate to the housing. A drive system is responsive to the sensor.

U.S. Pat. No. 6,510,817 to Horvath teaches a mouse and cheese cat toy, wherein a simulated mouse is propelled to appear in various locations (holes) relative to a simulated cheese face.

U.S. Pat. No. 6,571,742 to Tsengas teaches an interactive pet toy having a mouse that selectively extends from and retracts into a cheese housing.

Of considerable interest is U.S. Pat. No. 8,109,239 to Smestad et al, in which an interactive pet toy is disclosed having extendable and retractable flexible target in which a flexible, elongated target attached at a distal end of the blade, wherein said airflow causes the ribbon to extend through egress port. The rotation of the blade mechanism causes said ribbon to retract into the housing the blade mechanism rotates past said egress port.

However, such devices that rely on rotational drive systems tend to result in repetitive or otherwise predictable motions. Consequently, a need has been felt for providing a new type of pet and owner game that is of a type more nearly related to the human game of hide-and-seek, or the baby game of peekaboo, and that will capitalize on animals, particularly domestic animals innate interest in hit-and-run and am bush-type games where the hunter is rewarded for his patience.

SUMMARY OF THE INVENTION

Therefore, it is an object of the present invention to provide an interactive pet toy game.

It is another object of the present invention to provide an outer housing for holding the operational mechanism for a toy-like object.

It is another object of the present invention to provide a toy-like object which includes a randomly moved object that would be appealing to an animal.

It is another object of the present invention to provide an interactive toy which includes a means for extending or projecting the object through an opening in the housing at least a short distance outside of the housing.

It is another object of the present invention to provide a means capable of randomly extending and retracting from the housing, within the view of the pet to peak the animal's interest and curiosity.

It is still another object of the present invention to provide an interactive pet toy game that is attractive to both young and old pets, and that maximizes interaction with the pet.

Briefly described according to one embodiment of the present invention, an interactive pet toy is provided. The pet toy of the present invention comprises an outer housing forming a travel guide in which a plurality of egress openings are formed about the circumference. The housing holds and obscures a motorized mechanism for urging an elongated, flexible target. The target may be a length of flexible tubing terminating with a feather element, with the length of tubing sized so that the feather may extend at least partly through an access/egress port. A centralized drive hub drives has a double D configuration to allow a cam action snapping of the target when rotated. A drive motor is controlled to rotate bidirectionally in a random pattern so that the target can "appear" to protrude from any one of the egress ports in a non-sequential pattern. As the tubing moves, the feather-like target appears randomly about the housing to entice the cat into interaction.

The toy thereby simulates hide-and-seek or peekaboo action moving randomly in and out in a non-sequential pattern about the housing, thereby catching the pet's attention and stimulating the animal's instinctive curiosity.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
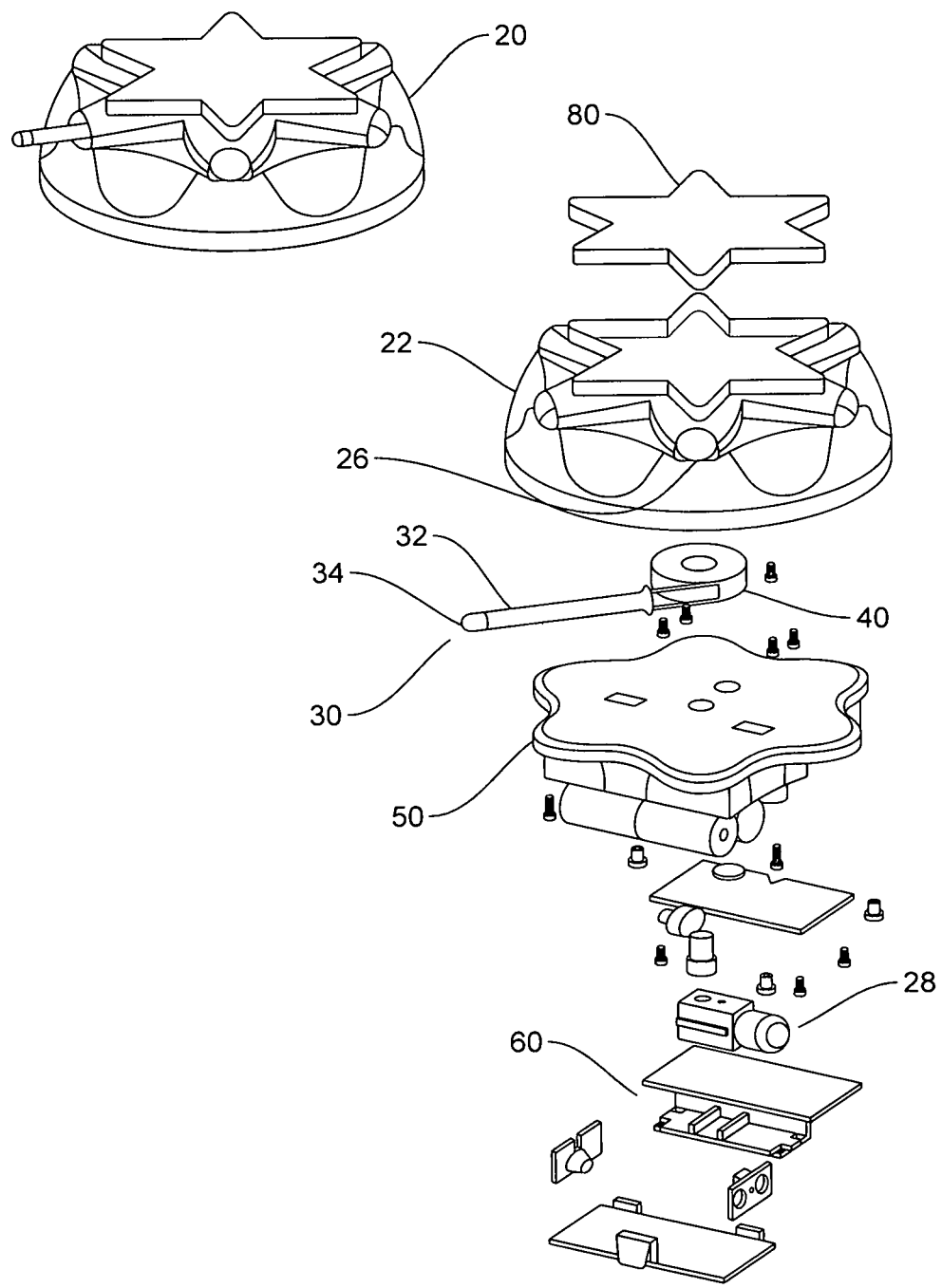
FIG. 1 is a top exploded perspective view of an interactive pet toy according to the preferred embodiment of the present invention.
Figure 2:
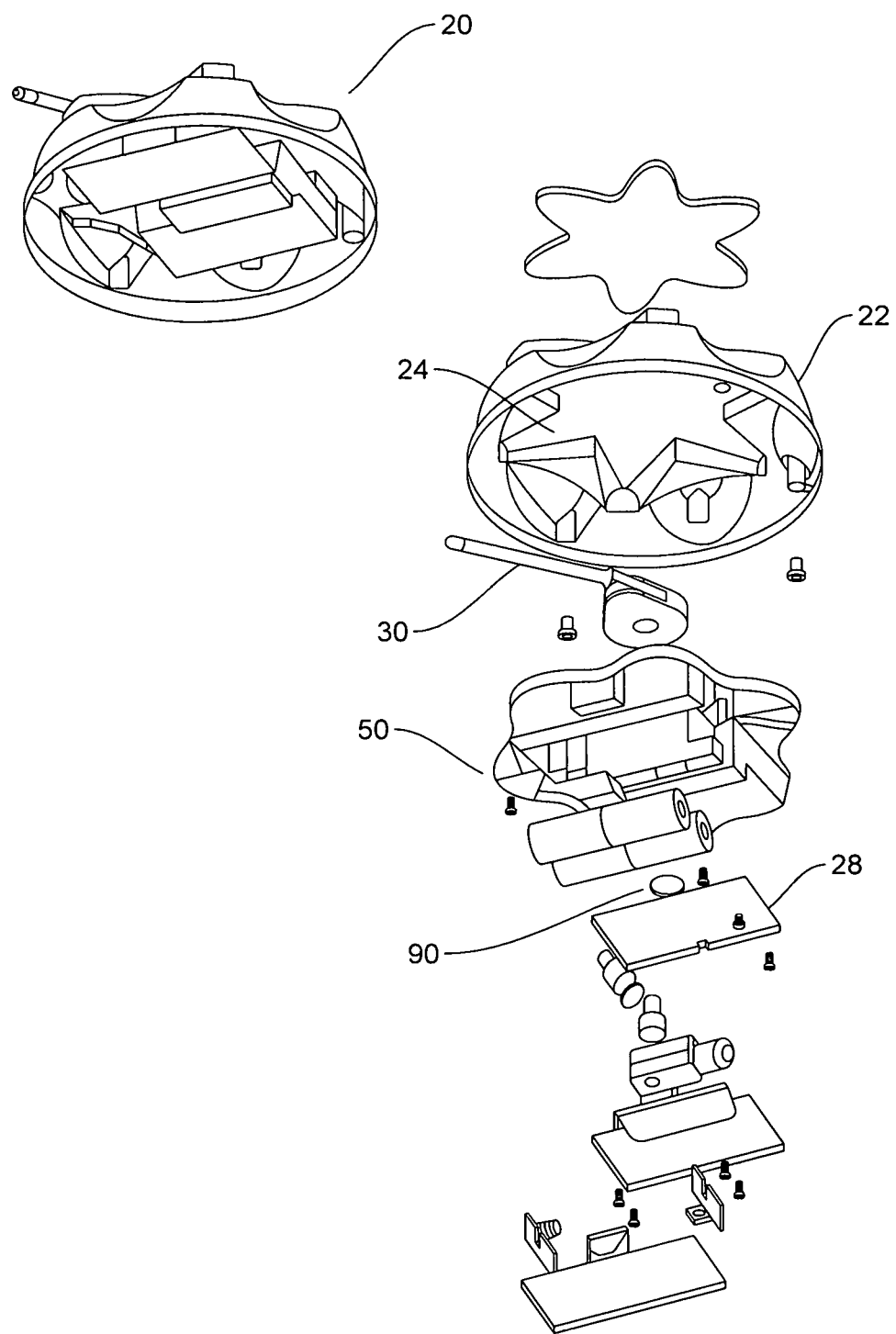
FIG. 2 is a bottom exploded perspective view thereof.
Figure 3:
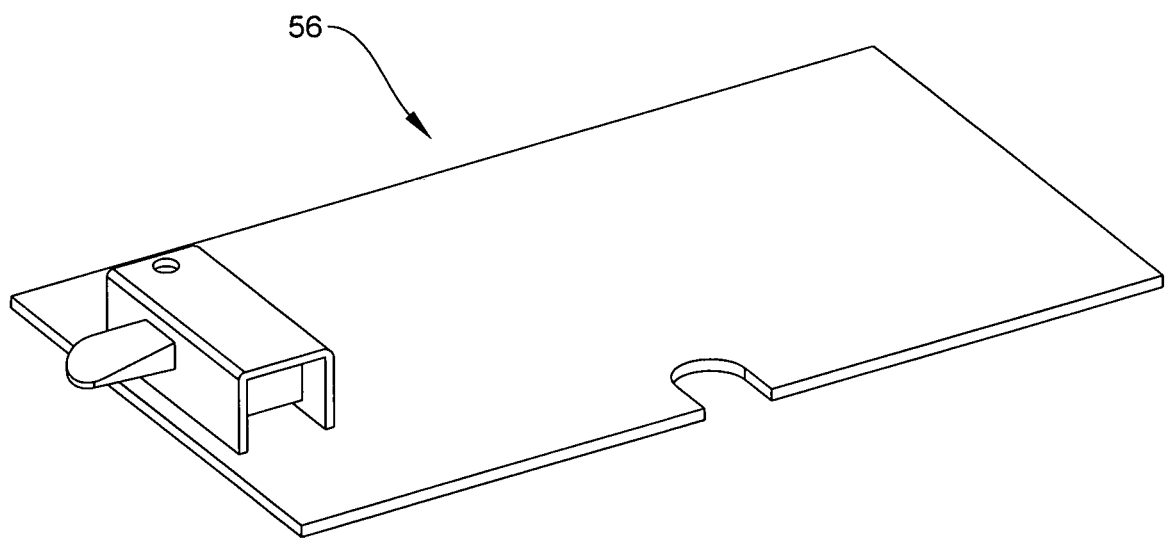
FIG. 3 is a front perspective view of an PCB board and module and switching mechanism for use in conjunction with the present invention.
Figure 4A:
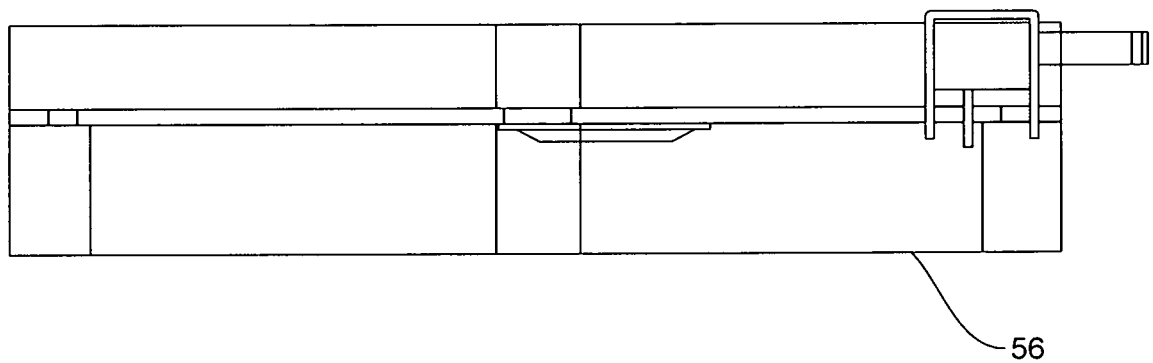
FIGS. 4A, 4B, and 4C are side, top and front elevational views, respectively of the PCB board and module of FIG. 3.
Figure 4B:
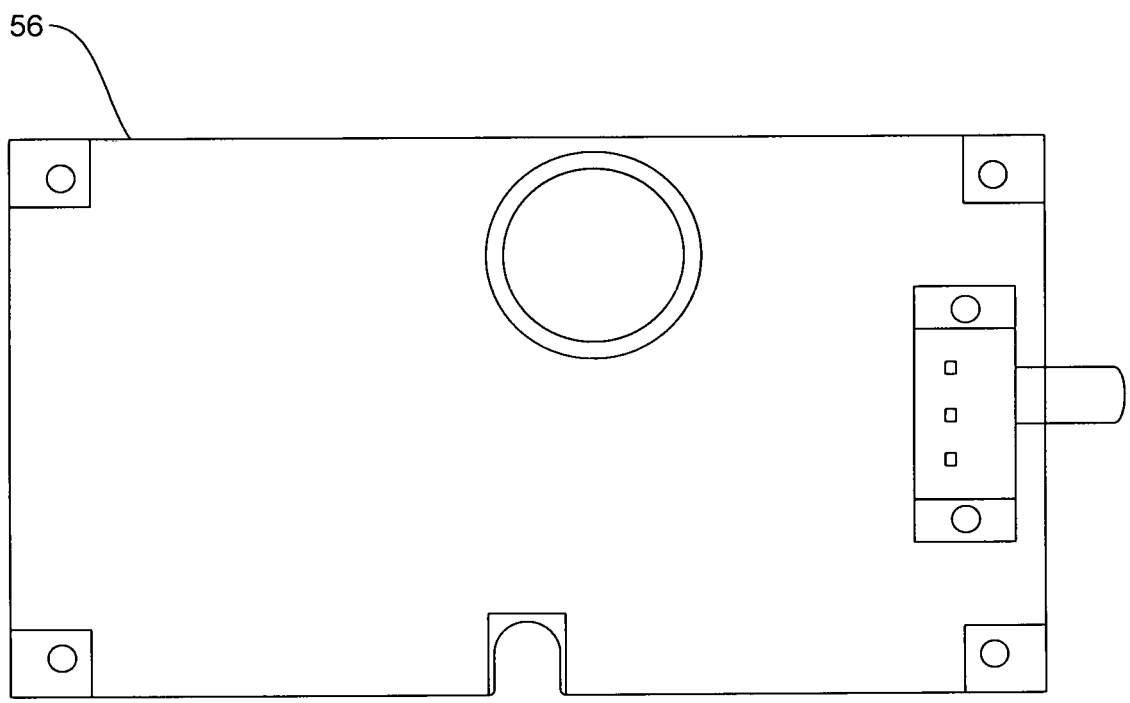
Figure 4C:
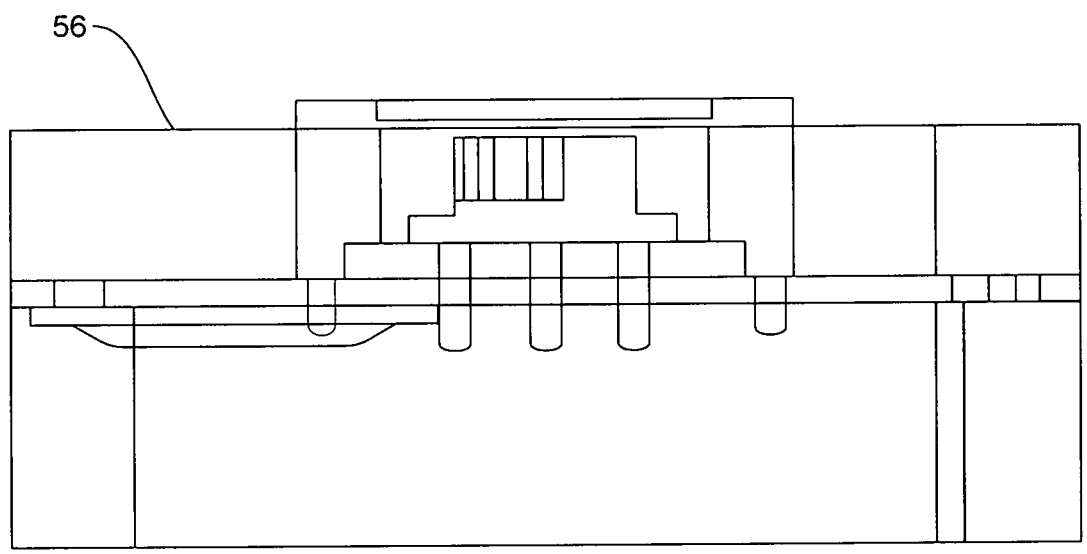
Figure 5:
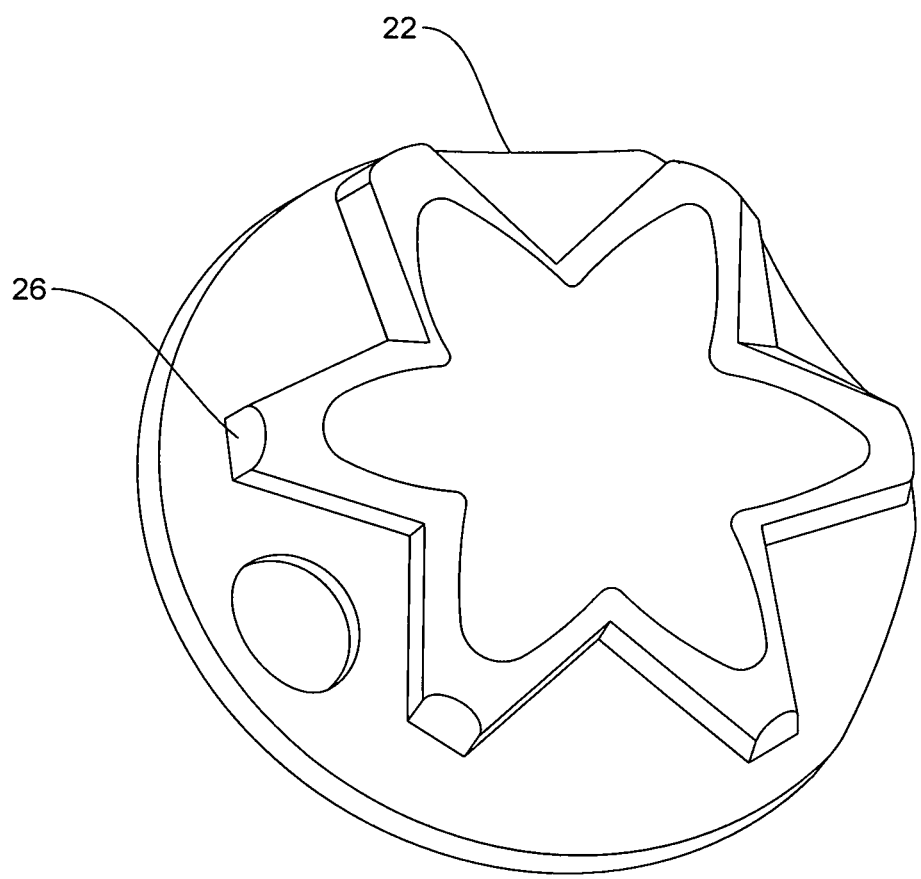
FIG. 5 is a top perspective view of a single part housing for use in conjunction with the present invention.
Figure 6:
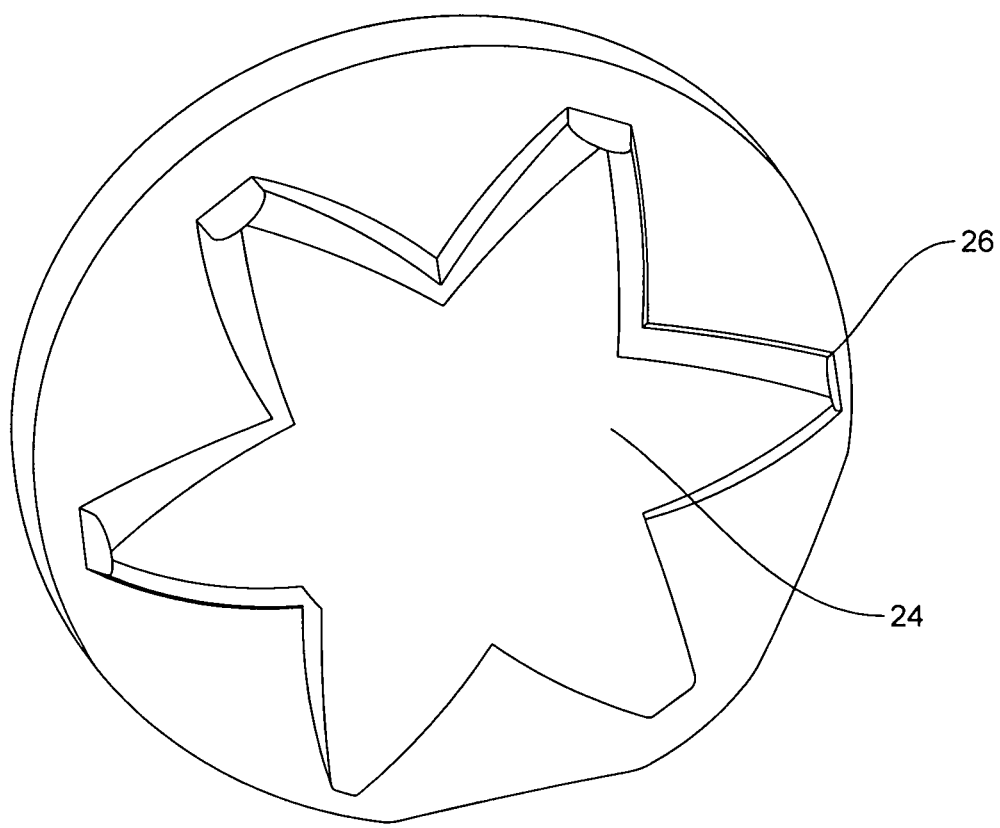
FIG. 6 is a bottom perspective view of the housing of FIG. 5.
Figure 7A:
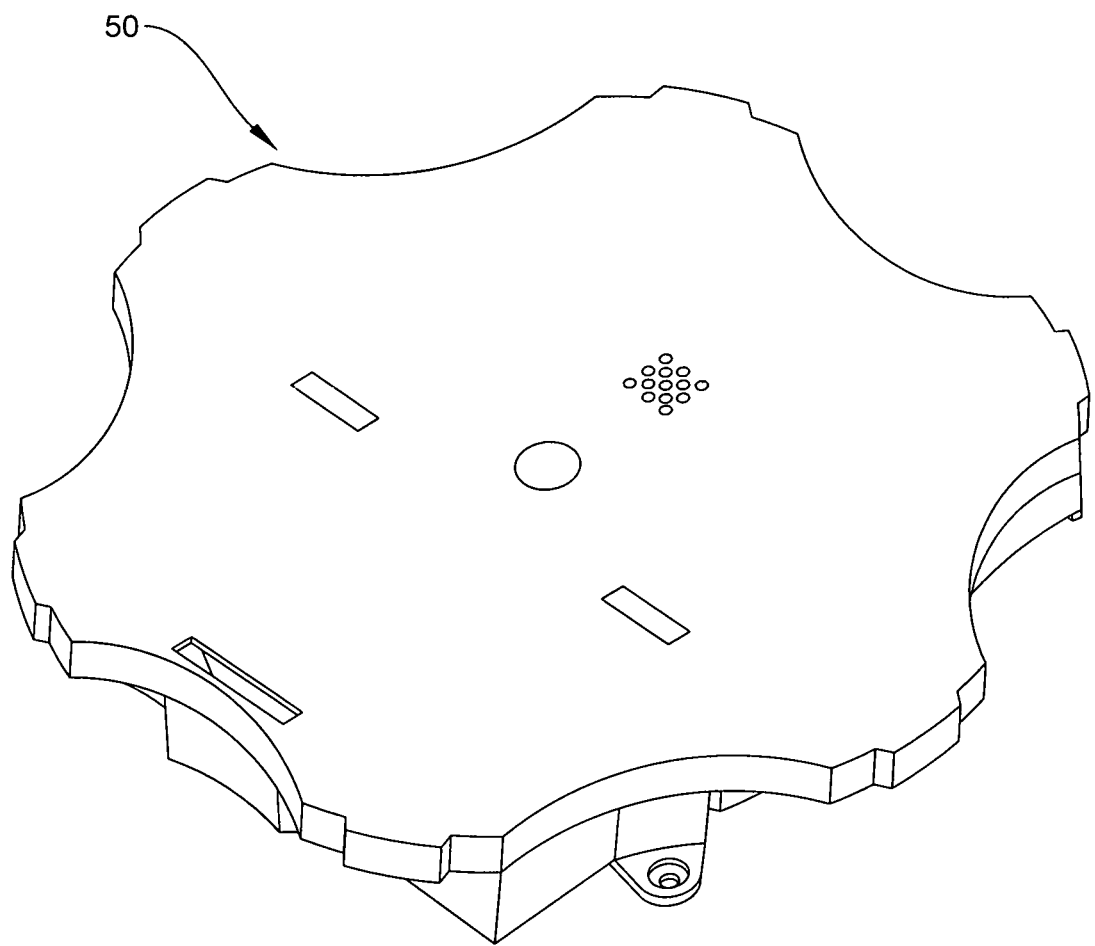
FIGS. 7A, 7B and 7C are bottom perspective, top side perspective, and top lower perspective views, respectively, of an inside support piece for use in conjunction with the present invention.
Figure 7B:
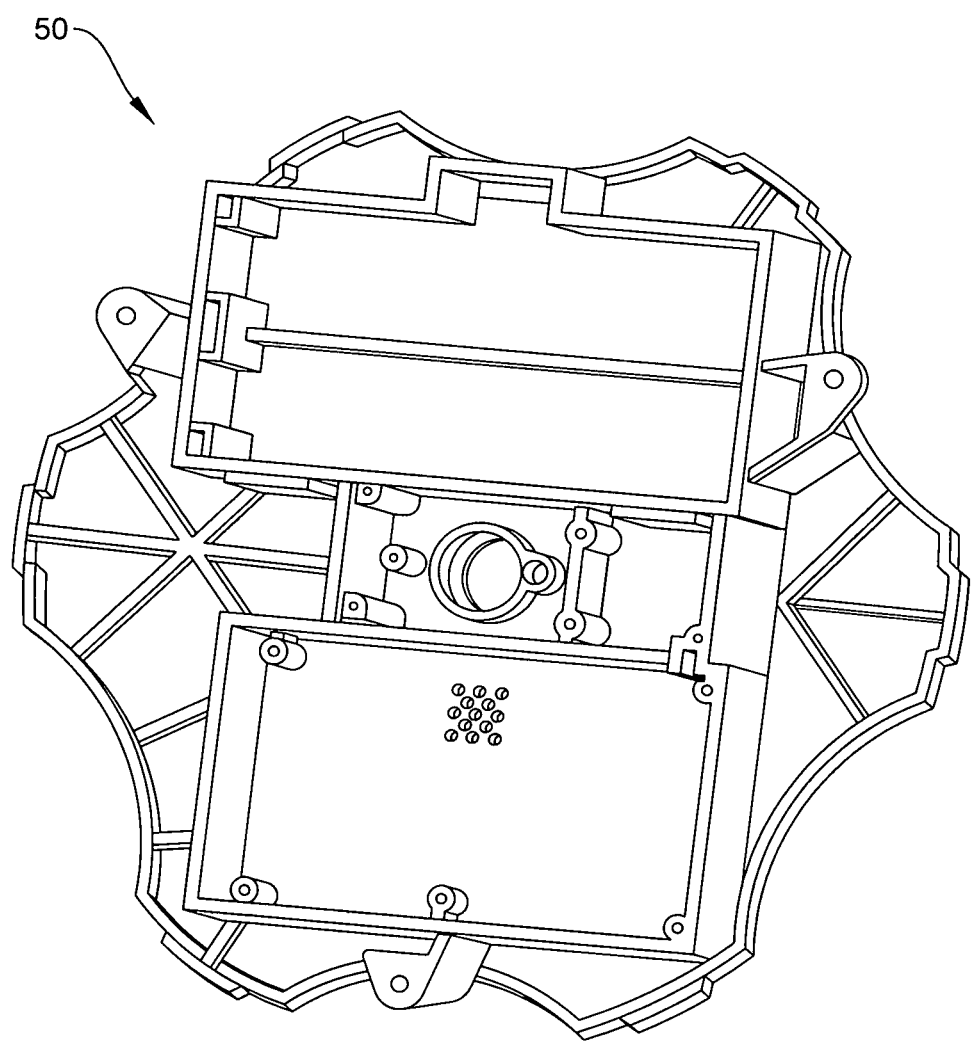
Figure 7C:
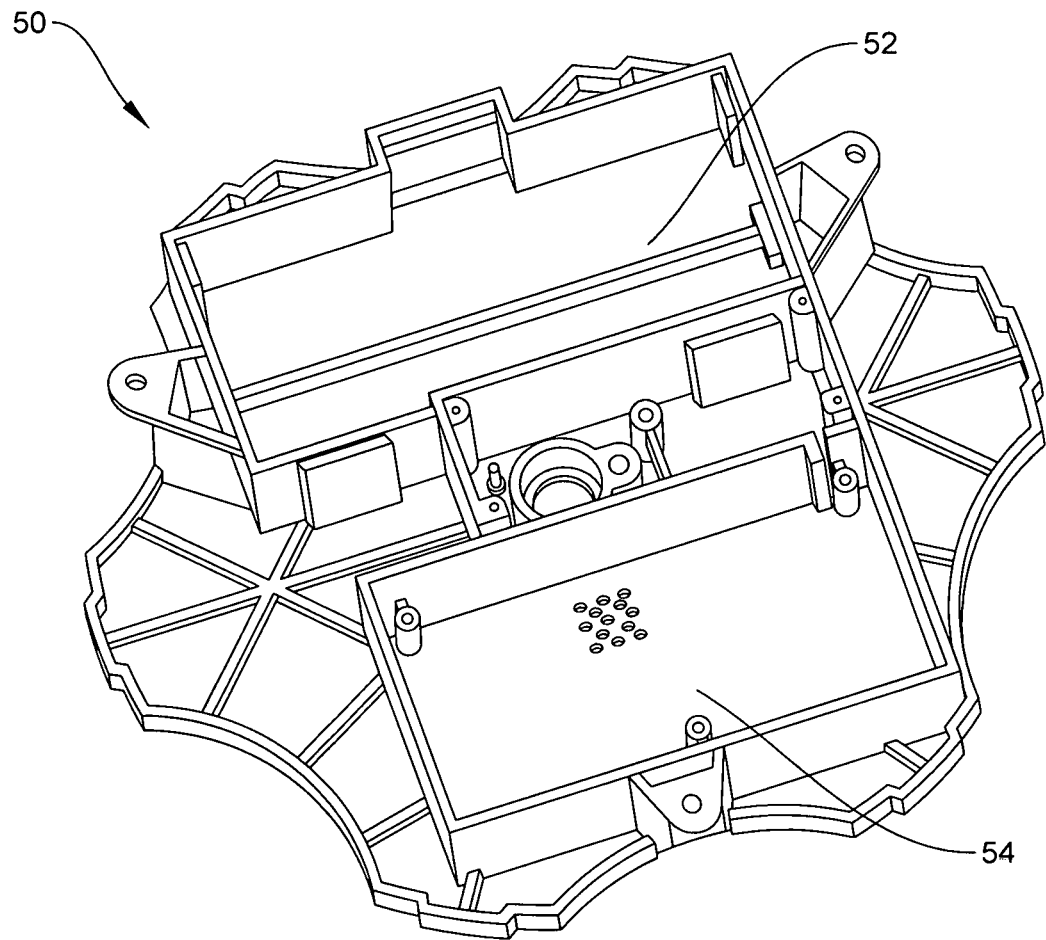
Figure 8A:
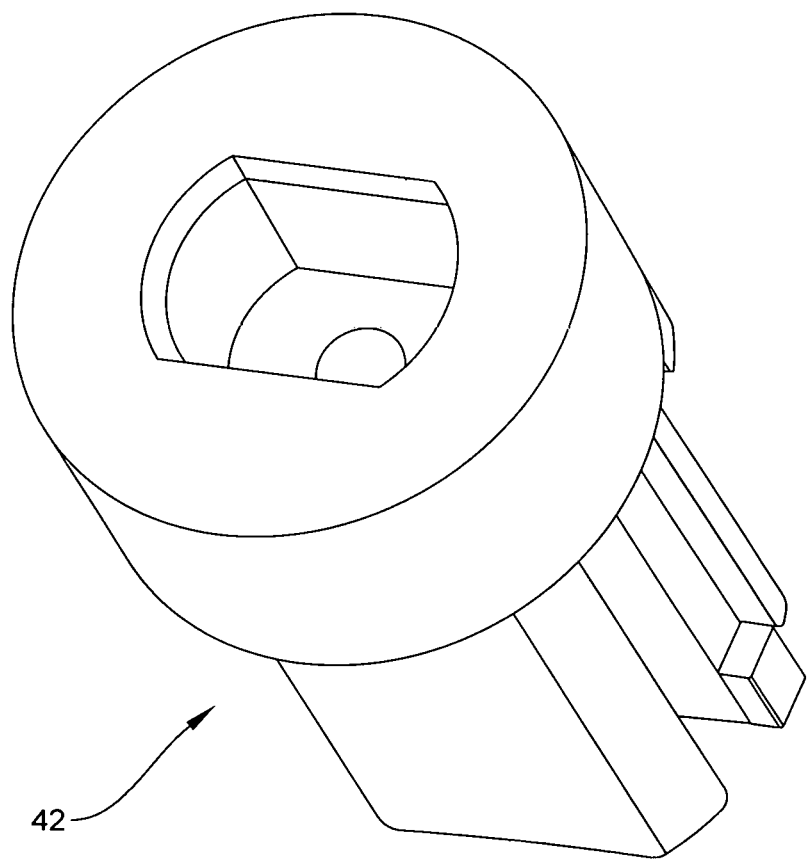
FIGS. 8A, 8B and 8C are bottom perspective, top side perspective, and top lower perspective views, respectively, of a drive shaft for use in conjunction with the present invention.
Figure 8B:
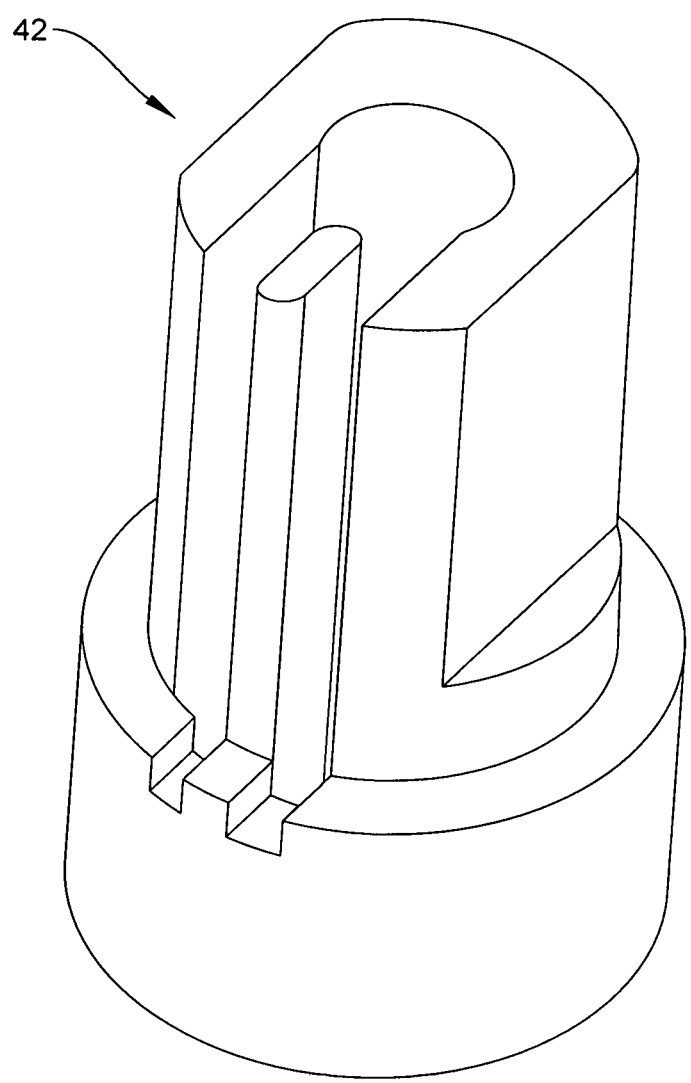
Figure 8C:
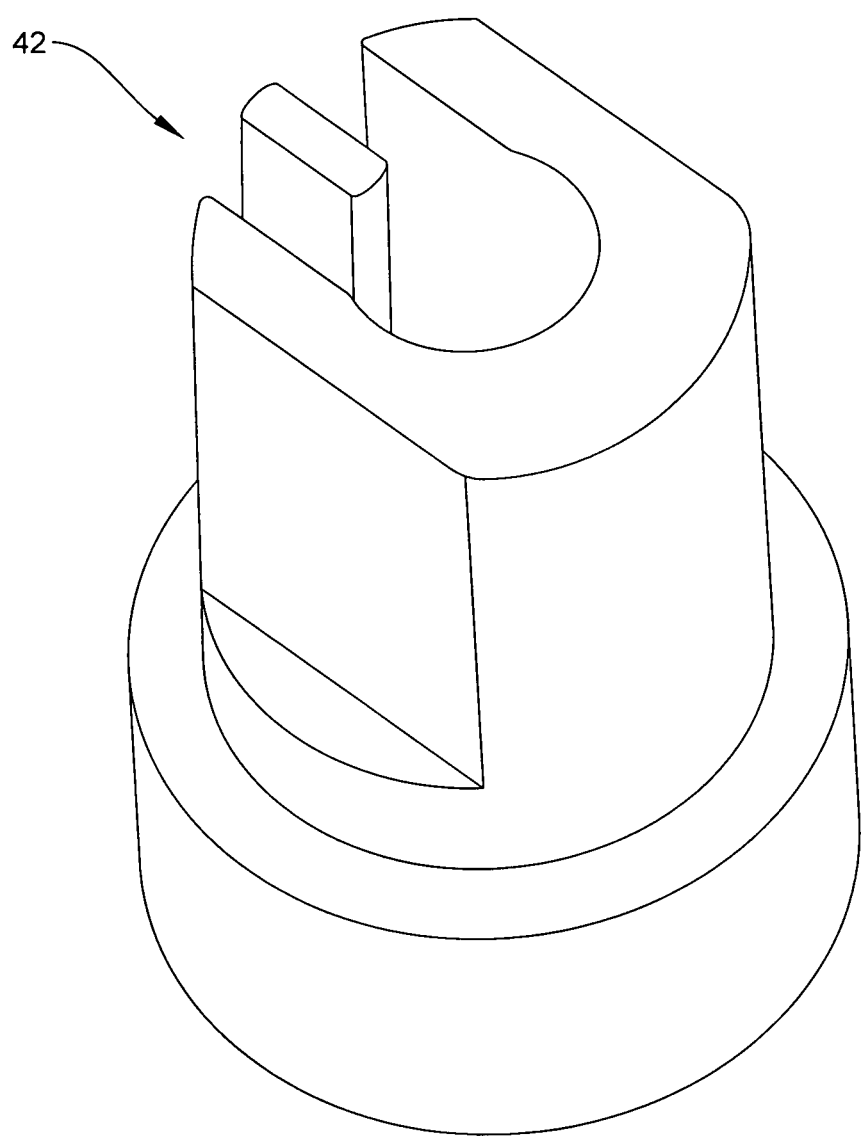
Figure 9A:
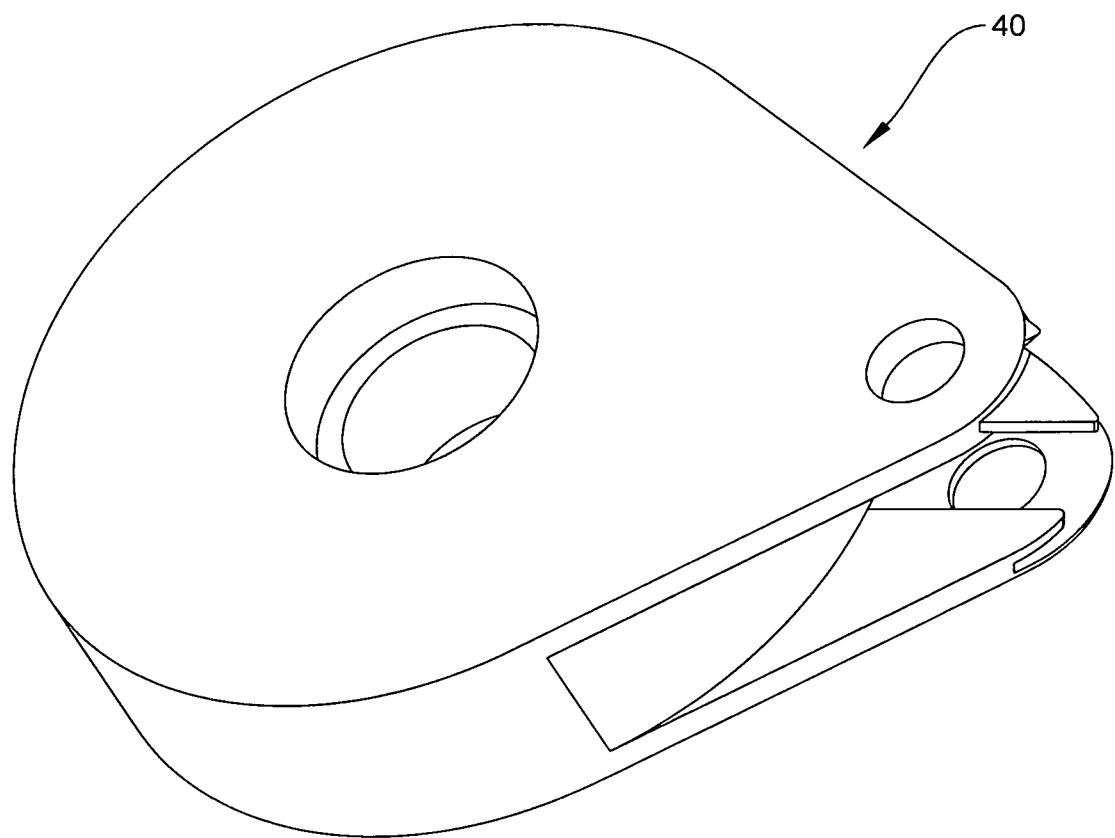
FIGS. 9A and 9B are top perspective and bottom perspective views, respectively, of a drive hub for use in conjunction with the present invention.
Figure 9B:
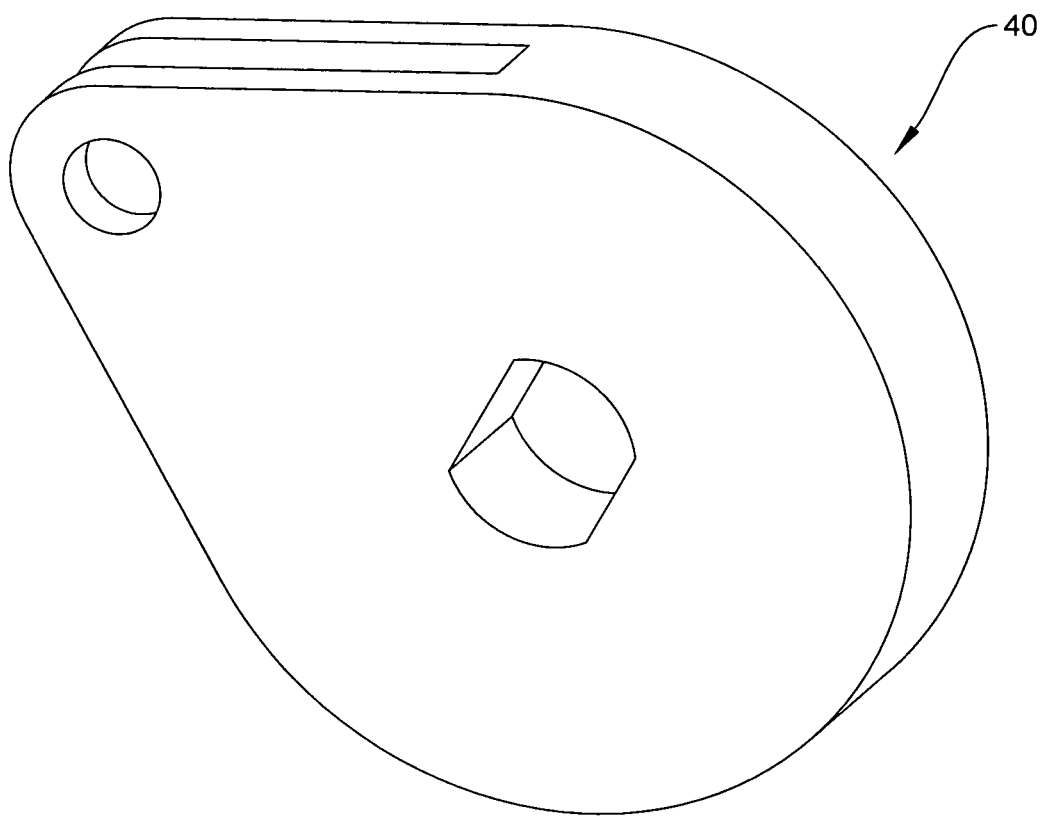
Figure 10A:
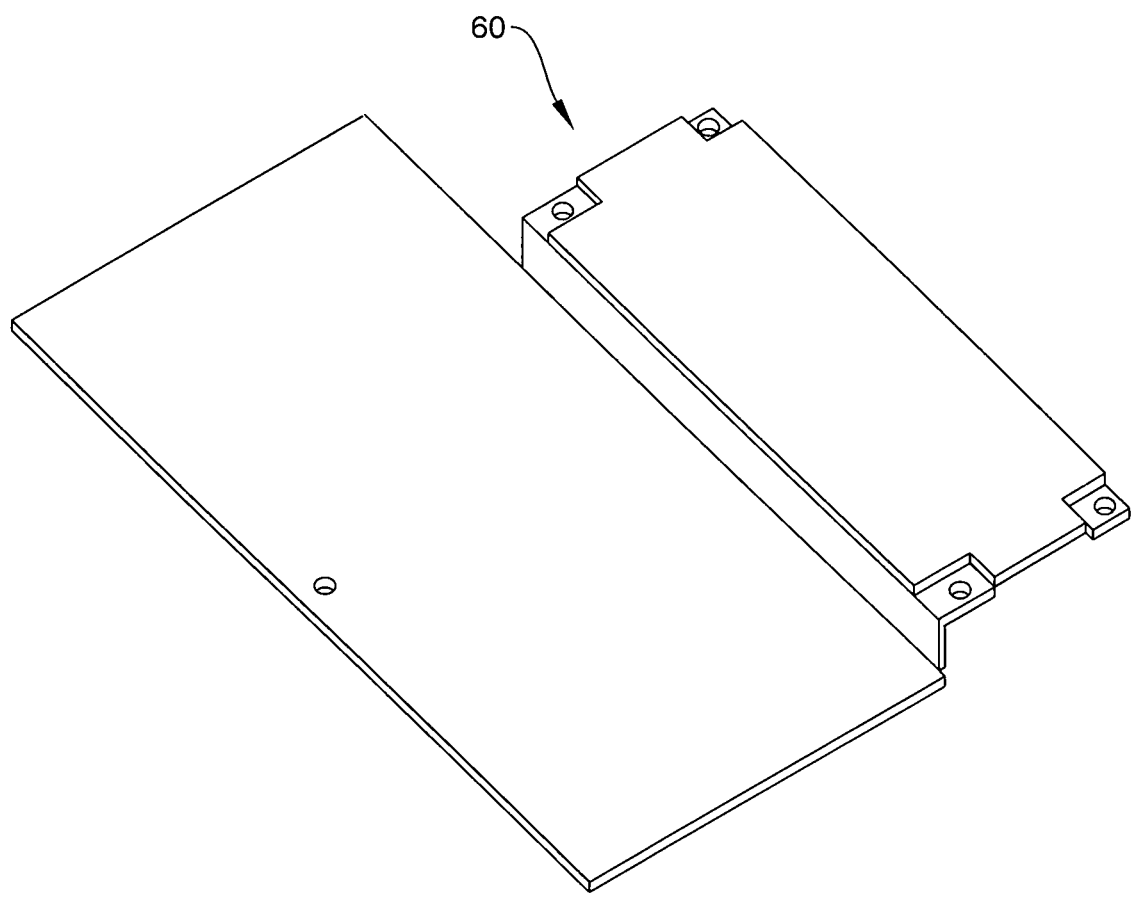
FIGS. 10A and 10B are top perspective and bottom perspective views, respectively, of a PCB and Gearmotor Cover for use in conjunction with the present invention.
Figure 10B:
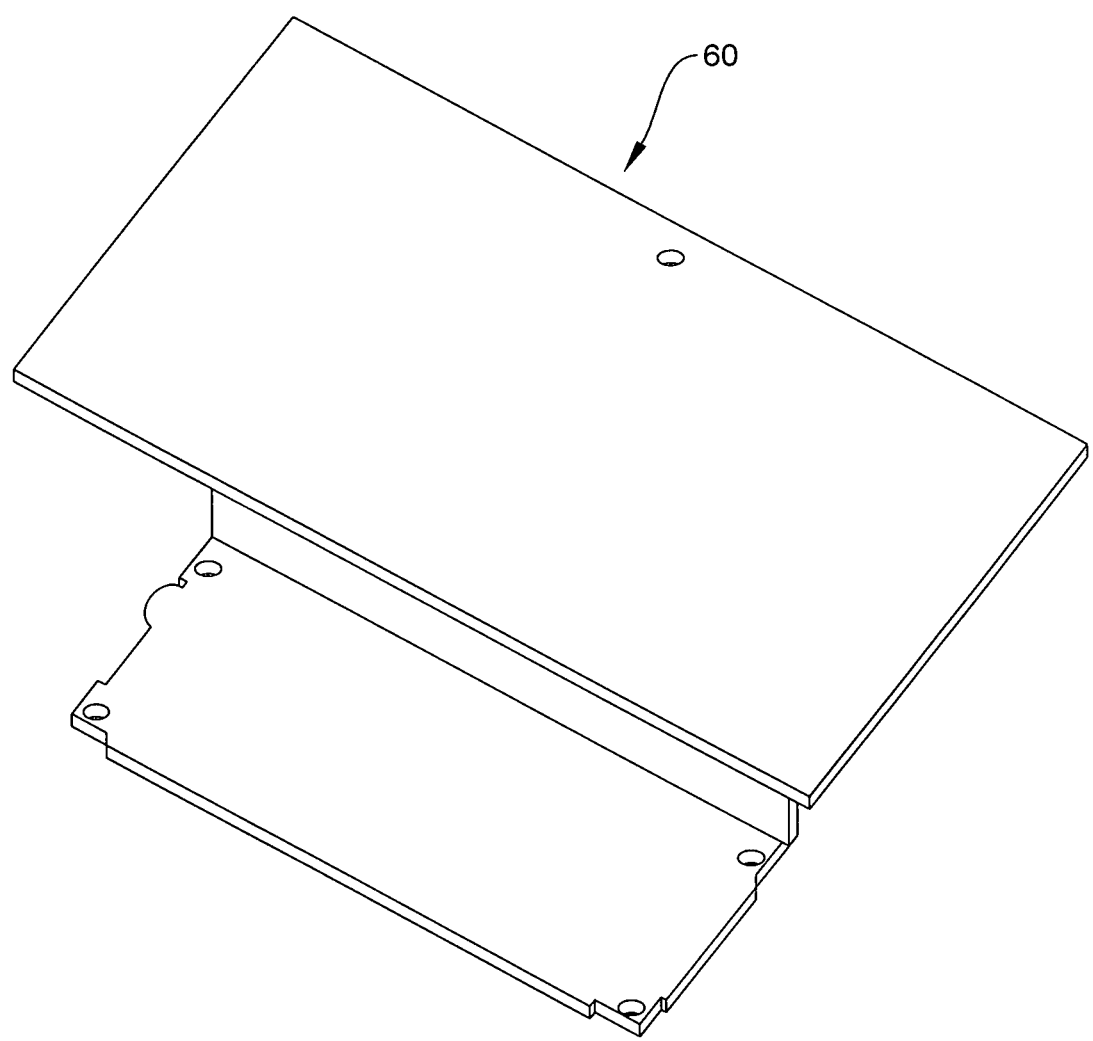
Figure 11A:
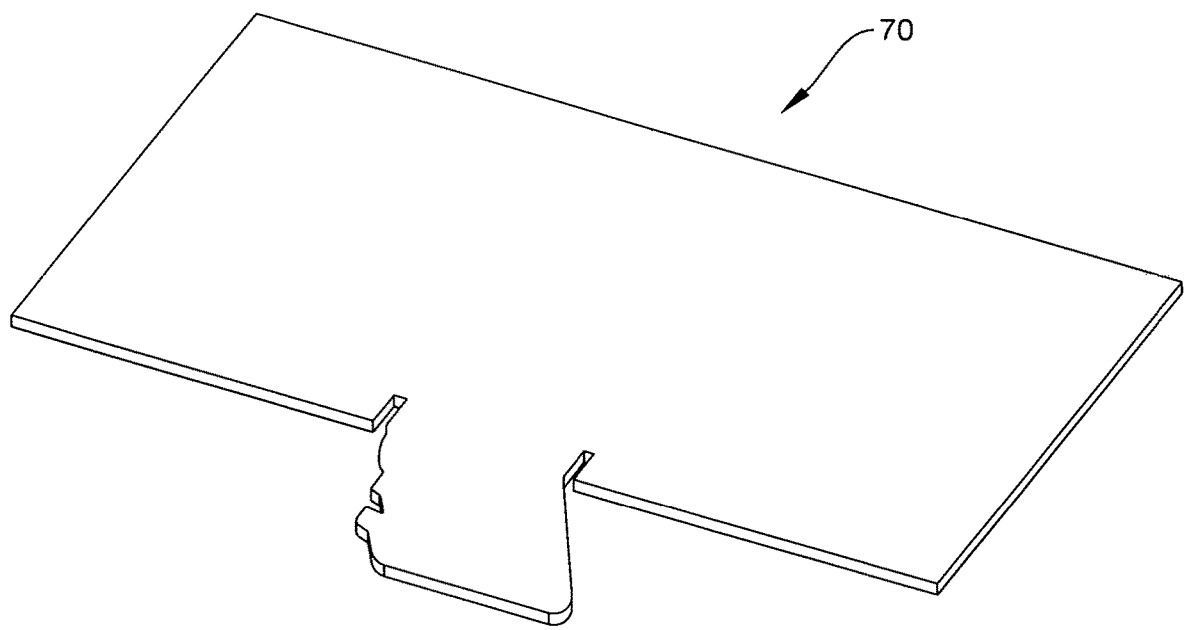
FIGS. 11A and 11B are top perspective and bottom perspective views, respectively, of a batter cover for use in conjunction with the present invention.
Figure 11B:
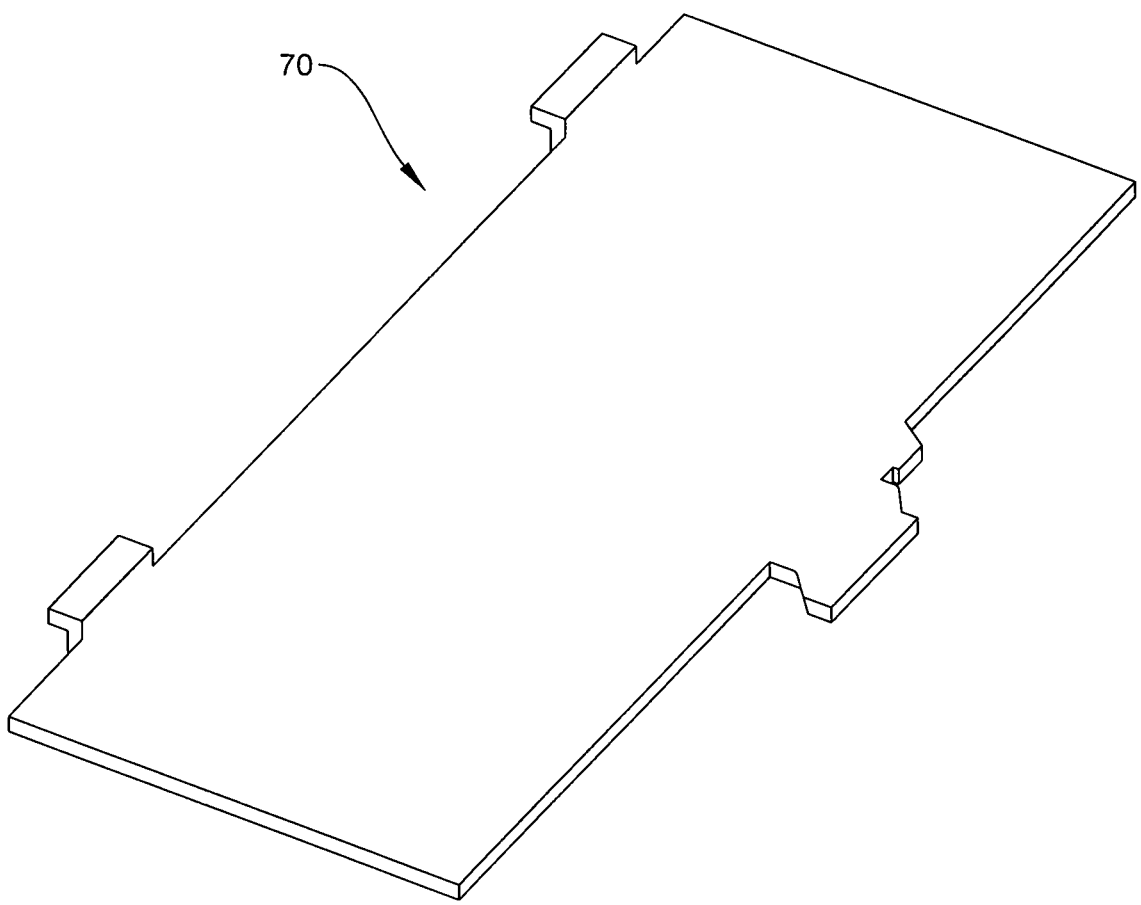
Figure 12:
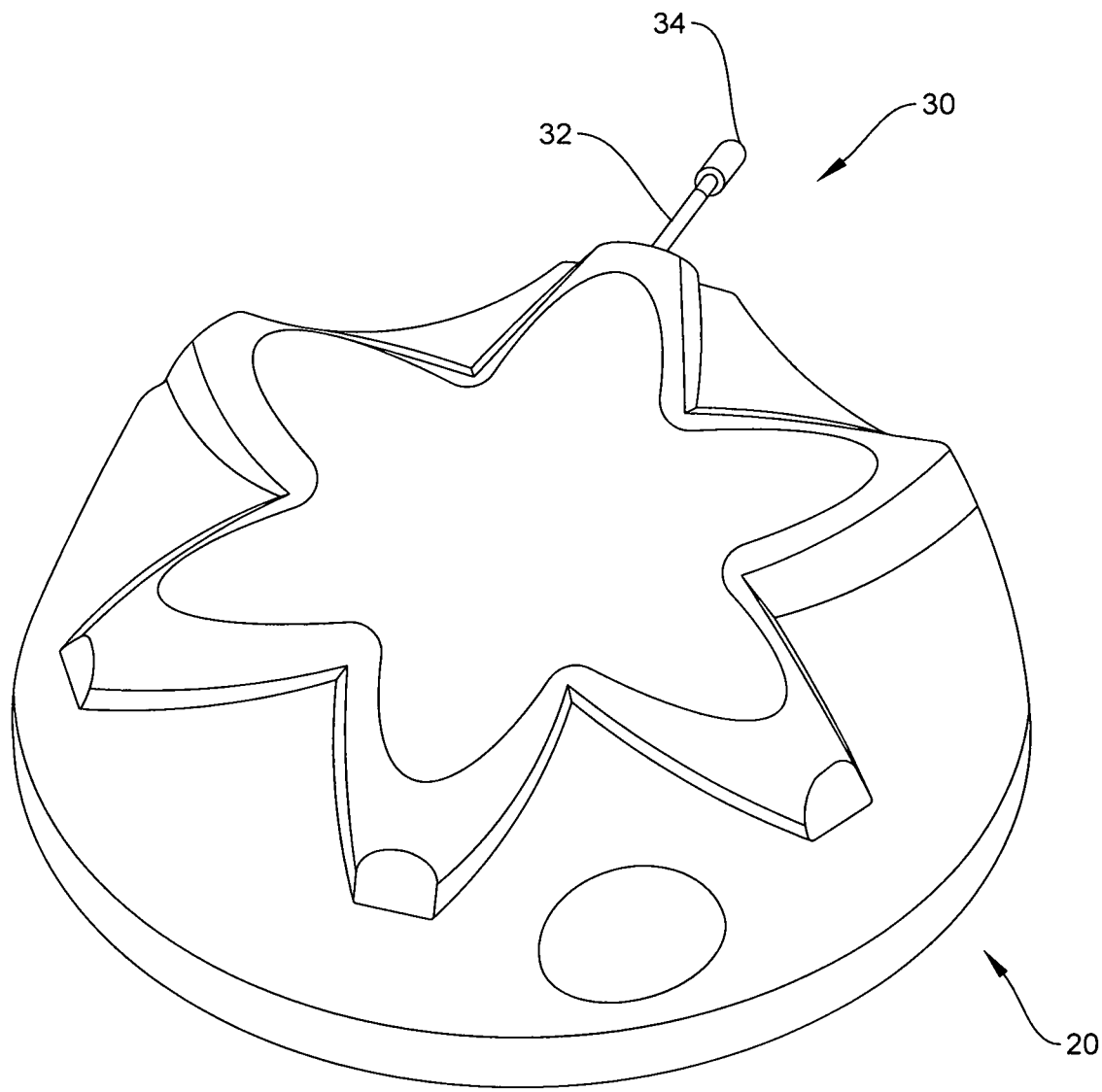
FIG. 12 is a top perspective view of the interactive pet toy according to the present invention.
Figure 13:
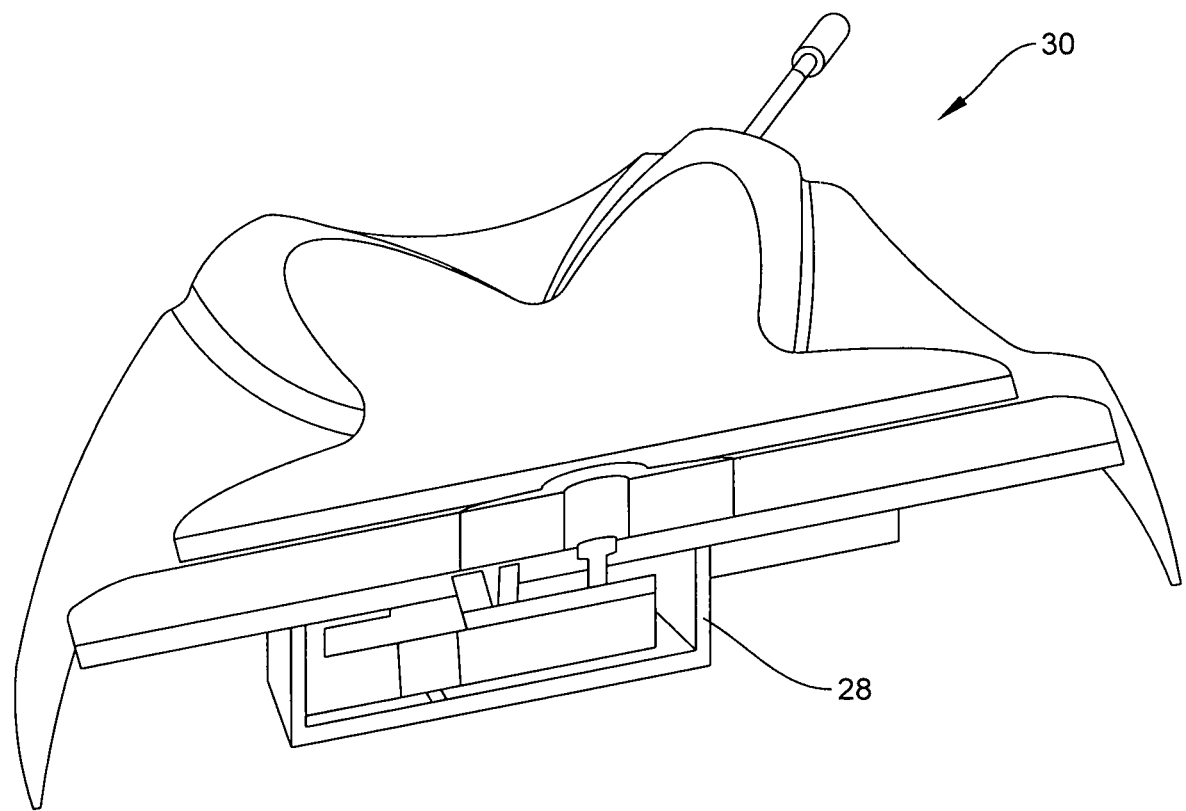
FIG. 13 is a top perspective cross sectional view thereof.
Figure 14:
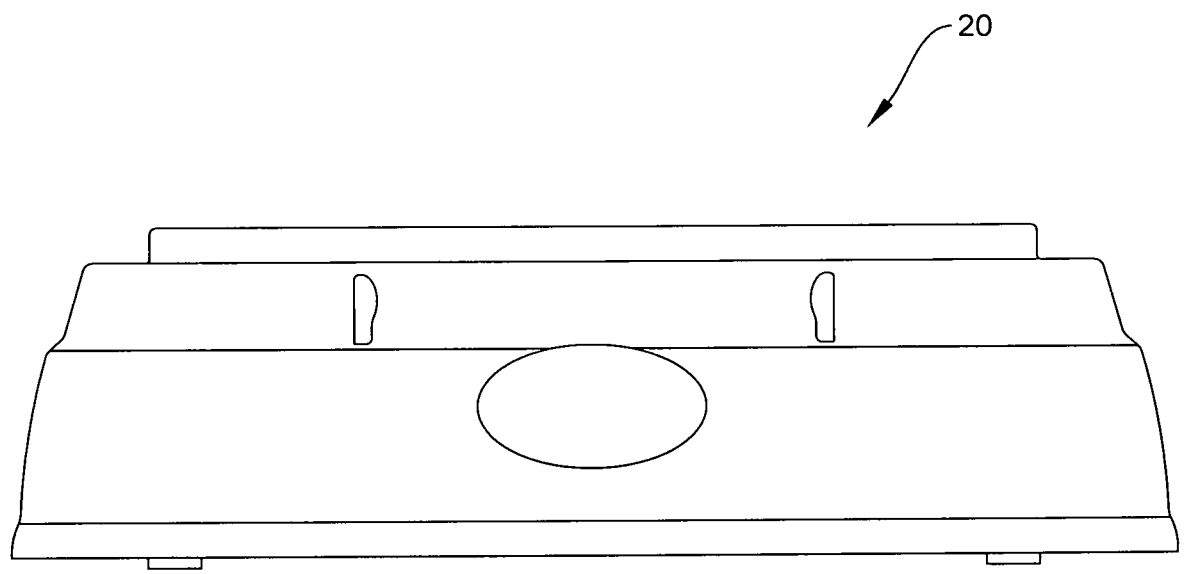
FIG. 14 is a front elevational view thereof.
Figure 15:
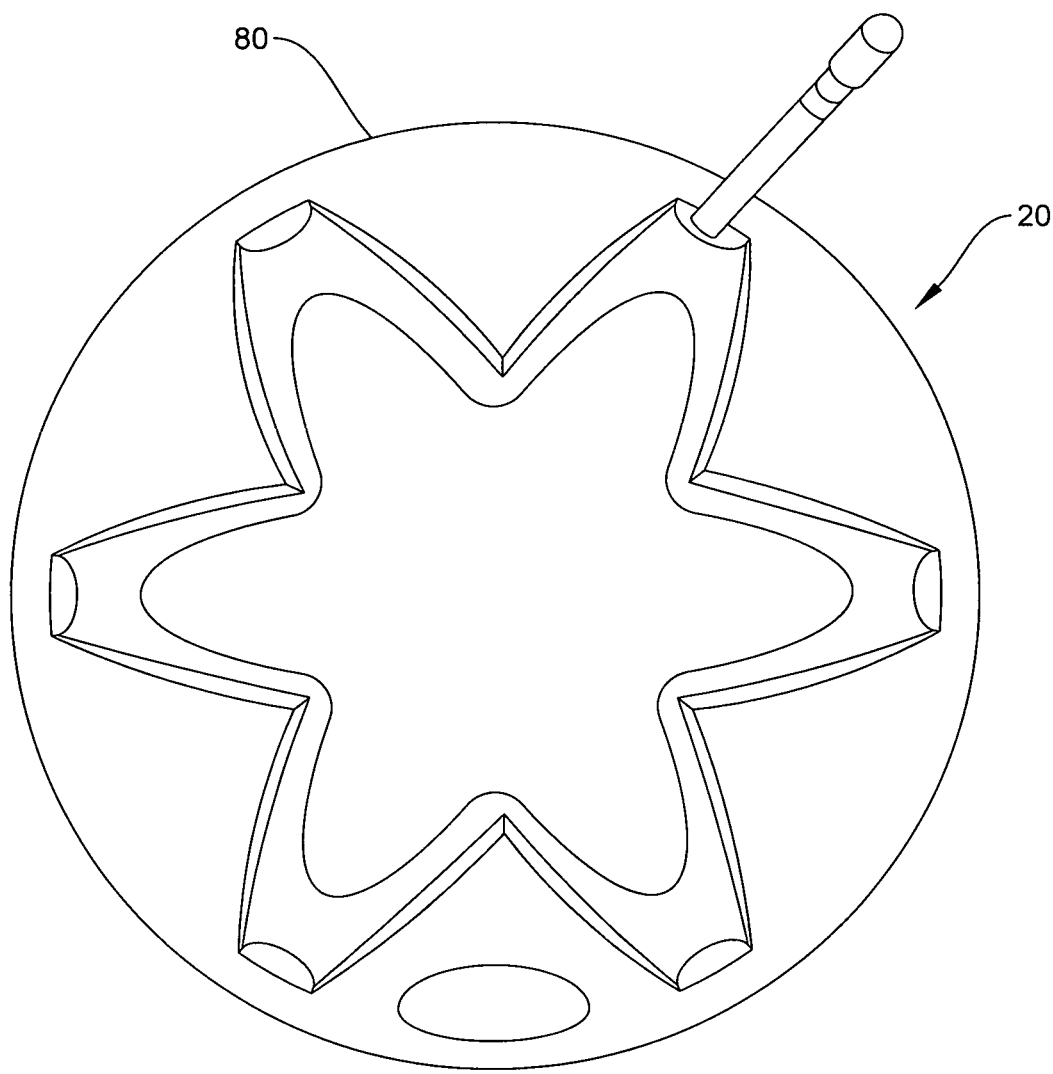
FIG. 15 is a top plan view thereof.
Figure 16:
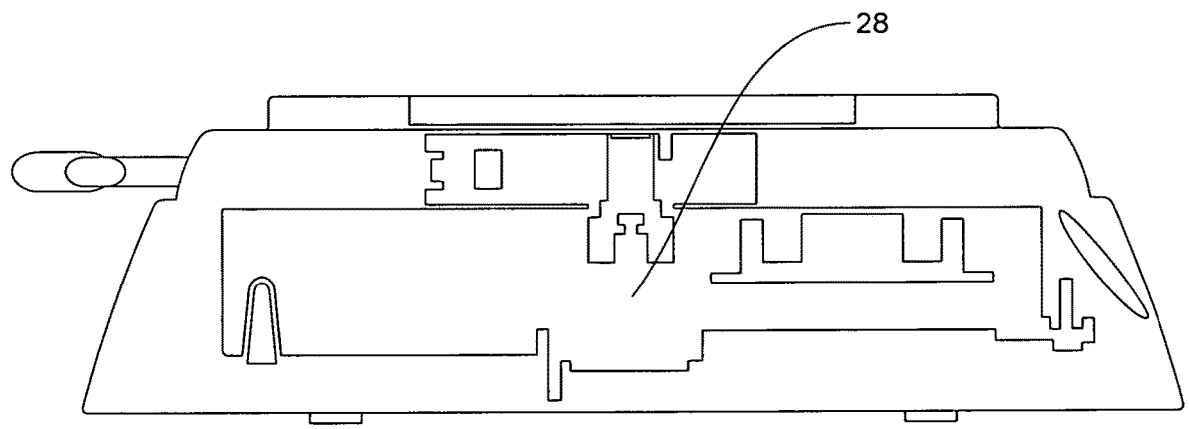
FIG. 16 is a cross sectional side elevational view thereof.

Referring now to the Figures, an interactive pet toy, generally noted as 20, of the present invention comprises an outer housing 22 formed of a single molded part and further forming a travel guide 24 in which a plurality of egress openings 26 are formed about the circumference. The housing holds 22 and obscures a motorized mechanism, generally noted as 28, for urging an elongated, flexible target 30. The target 30 may be a length of flexible tubing 32 terminating with a feather element 34, with the length of tubing 32 sized so that the feather 34 may extend at least partly through an access/egress port 26.

A centralized drive hub drives 40 has a double D configuration to allow a cam action snapping of the target 30 when rotated. A drive motor 28 is controlled to rotate bidirectionally in a random pattern so that the target 30 can "appear" to protrude from any one of the egress ports 26 in a non-sequential pattern.

As the tubing 32 moves, the feather-like target 34 appears randomly about the housing 22 to entice the cat into interaction.

Additional details are shown throughout the Figures and include an inside housing support piece 50 to support the gear motor 28 as well as form compartments for receiving batteries 52 and holding and containing a PCB board 54. The PCB board 56 itself provides the logic electronics, switching mechanisms and other controls to operatively drive the motorized hub in the desired pattern.

A PCB and Gearmotor cover 60 removably seals and covers the PCB compartment 54. A battery cover 70 removably seals and covers the battery compartment 52.

It is envisioned that the cover 22 is formed of a single part molded housing and further defines a travel path of an radial star or flower pattern, such as shown throughout the figures. It is envisioned that other shapes for the housing cover 22 are contemplated by the present invention and does not form a limitation on the functionality of the present invention;

Additional features may further be incorporated in combination, such as a scratch pad 80 being affixed onto the top of the housing, and a sound module 90 for generating an animal enticing sound in conjunction with the random, orbital, in-and-out motion that is generated with the target 34.

It should be understood that the target 30 can extend various distances out of the housing and that the distance that the object may extend may be adjustable. The disclosure is intended to describe preferred embodiments of the present invention.

It should be further understood that the randomly appearing, reciprocated target is the key interactive feature of the present invention, and that it may be enclosed in any shape housing and that the housing 22 depicted in the figures is shown by way of example only.

2. Operation of the Preferred Embodiment

As the drive shaft 42 urges the drive hub 40 to circulate, the target 30 is urged about the travel path 24 within the housing cover 22. As the target moved about the travel path, the ribbon-like target 30 extends out the egress ports 26. A randomized motion of the motor will cause the target 30 to appear in various, unanticipated egress ports 26 in order to entice and surprise a cat that is interacting with the device 20. It has been found that in using such a device, the appearance of a feature provided that darts in and out randomly creates a surprising effect that stimulates a cat in an enjoyable fashion. Further, the movement of the target within the housing in conjunction with attractant noises further stimulates a cat.

Additionally, other interactive stimulation is anticipated as being incorporated in conjunction with the "waving tail" visual stimulation provided, such as the incorporation of a sound device that preferably emits a prerecorded sound in response to movement or propulsion/retraction of the pet. This prerecorded sound can be a "permanent" prerecorded sound such as an animal's voice, such as "meow" or "purr", a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device is sensing motion of pet. Preferably, the sound simulates a natural prey of the pet, the pre-recorded sound is a simulated sound being reflective of the sound made by the natural prey, i.e., squeak for a mouse or chirp for a bird.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by the following exemplary claims nor by any possible, adverse inference under the rulings of *Warner-Jenkinson Company*, v. *Hilton Davis Chemical*, 520 US 17 (1997) or *Festo Corp*. V. *Shoketsu Kinzoku Kogyo Kabushiki Co.*, 535 U.S. 722 (2002), or other similar caselaw or subsequent precedent should not be made if such claims are amended subsequent to this Patent Application.

What is claimed is:

1. A method for attracting the attention of and interacting with a domestic pet comprising: providing a molded outer housing forming a travel guide defining a travel path, said travel guide further forming a plurality of egress openings at radial vertices;

providing a centralized drive hub and drive motor positioned on a support piece;

providing an elongated flexible target having one end connected to said centralized drive hub inside said housing; said elongated flexible target having an overall length longer than a radius of the travel guide such that a terminal end of the elongated flexible target extends outward past the egress openings;

activating said drive motor to rotate the elongated flexible target creating a peek-a-boo or hide-and-seek movement as the elongated flexible target randomly appears and disappears in and out of said egress openings at the radial vertices.

2. The method of claim 1, wherein said drive motor operates bidirectionally so that the elongated flexible target can pass by said egress openings in a non-sequential pattern.

3. The interactive pet toy of claim 1, wherein said elongated flexible target can extend at varying distances out of the housing and that said distances that the elongated flexible target may extend is adjustable.

* * * * *